United States Patent [19]

Baranyi

[11] 4,016,780
[45] Apr. 12, 1977

[54] HYPOTROCHOIDAL CLUSTER GEAR DRIVES

[75] Inventor: Sandor J. Baranyi, Ithaca, N.Y.

[73] Assignee: Trochoidal Gear Technology, Inc., Ithaca, N.Y.

[22] Filed: Mar. 3, 1975

[21] Appl. No.: 554,903

[52] U.S. Cl. .................................. 74/804; 74/805
[51] Int. Cl.² ........................................ F16H 1/28
[58] Field of Search .................... 74/804, 805, 760

[56] References Cited
UNITED STATES PATENTS 3,427,901   2/1969   Wildhaber ........................... 74/804

*Primary Examiner*—Samuel Scott
*Assistant Examiner*—Frank H. McKenzie, Jr.
*Attorney, Agent, or Firm*—Shlesinger, Fitzsimmons & Shlesinger

[57] ABSTRACT

This gear unit connects coaxial drive and driven shafts. It comprises two integral coaxial externally-toothed cluster gears which mesh, respectively, with two coaxial internal gears, one of which is secured in the fixed housing of the unit and the other of which is fixed to one of the shafts. The other shaft has a crank secured to it which drives a pin that is coaxial with the cluster gears but eccentric of the internal gears. The pin has a cylindrical bearing portion engaging a cylindrical thrust member carried by the internal gear which is fixed to one of the shafts. This thrust member is coaxial with the shafts.

10 Claims, 12 Drawing Figures

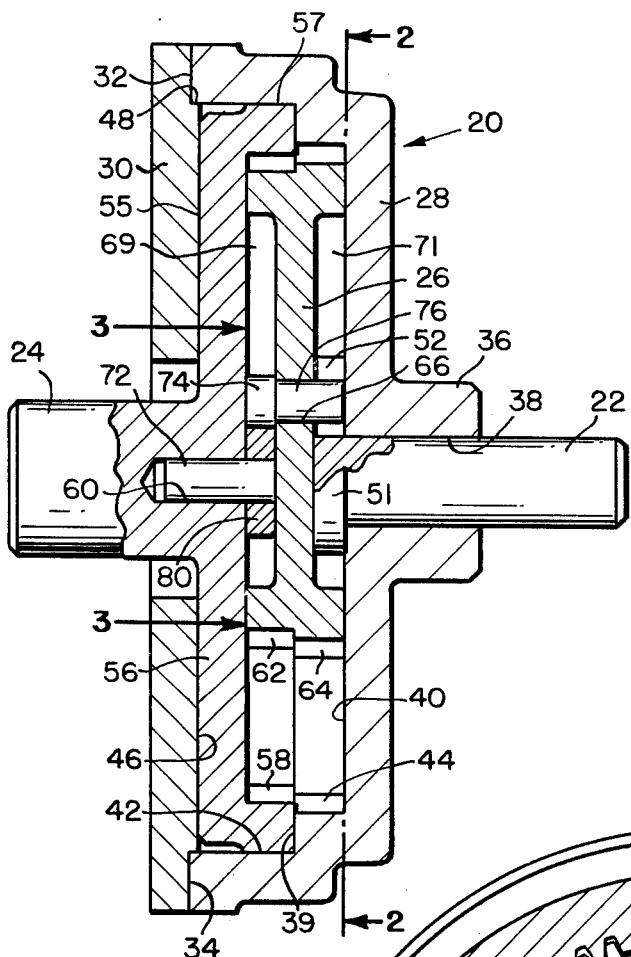
FIG. 1
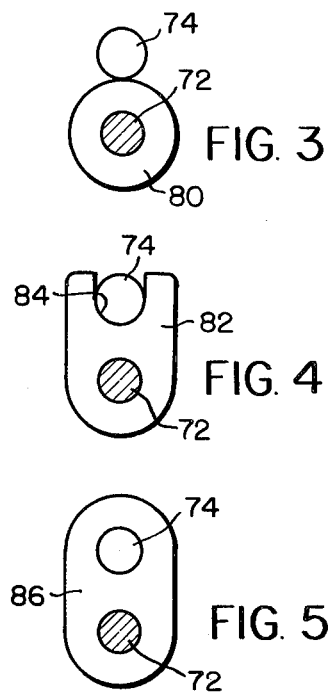
FIG. 3
FIG. 4
FIG. 5
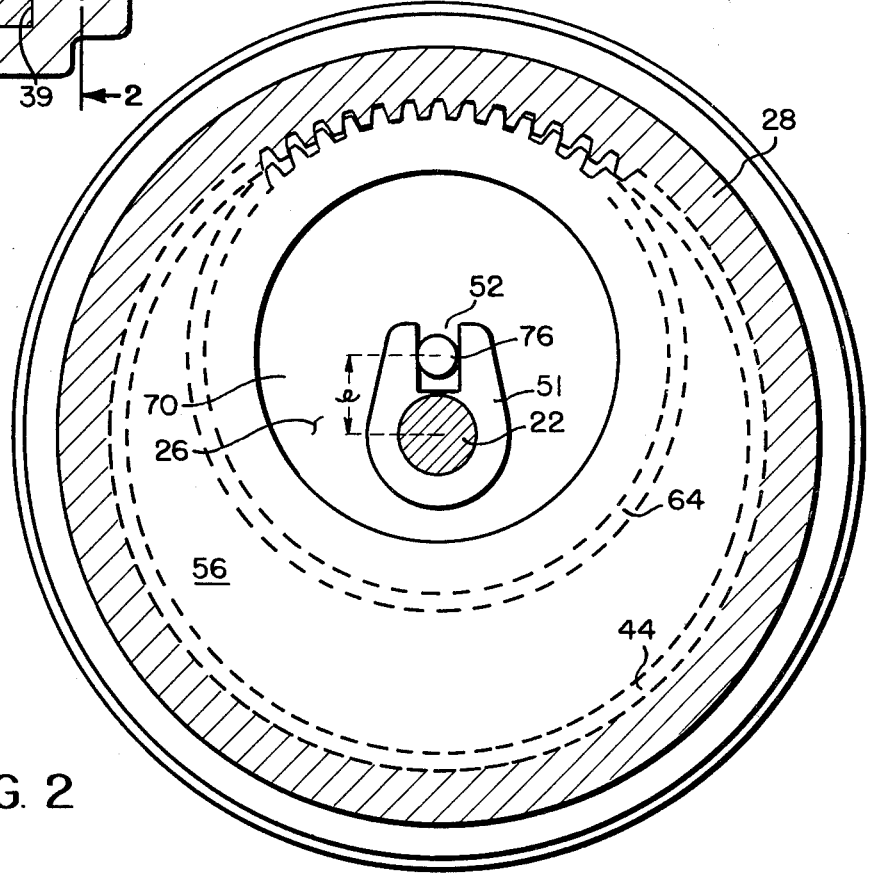
FIG. 2

HYPOTROCHOIDAL CLUSTER GEAR DRIVES

The present invention relates to gear units and more particularly to rotary gear type speed changers, such as speed reducers and speed multipliers.

In a still more specific aspect, the invention relates to speed reducers, and speed multipliers using externally toothed gear clusters that mesh with internally toothed gears.

Speed reducers employing cluster gears and internal ring gears are well known. Reducers, in which the cluster is mounted on and moved by an eccentric, are shown, for instance, in U.S. Pat. Nos. 2,861,481, 2,874,594 and 3,192,799. However, none of the prior arrangements have been completely satisfactory because they required an undesirable number of expensive components, or were not for various reasons, sufficiently efficient in operation.

One object of this invention is to provide an economical and compact gear-type speed changer for connecting coaxial input and output shafts, which is less expensive, simpler in construction, quieter, and better in performance than prior such units.

Another object of the invention is to provide a speed changer of the character described which can meet the requirements of demanding applications such as high speed, large loads, very high speed ratio, and small backlash.

Another object of the invention is to provide a speed changer incorporating gears having a high contact ratio and toothed engagement with less relative motion between the gear teeth in engagement, with the result that there is less wear on the components, higher efficiency of operation, and longer service life than is now experienced with conventional speed change units.

Another object of the invention is to provide a speed changer which has reliable and high performance bearings, and can be lubricated and sealed, for maintenance-free service life even under highly adverse conditions of operation such as in dusty or low temperature environments.

Other objects of the invention will be apparent hereinafter from the specification and from the recital of the appended claims, particularly when read in conjunction with the accompanying drawings.

In these drawings:

FIG. 1 is a part longitudinal section, part elevation, of a speed changer made according to one embodiment of this invention;

FIG. 2 is a sectional view of this unit taken along the line 2—2 of FIG. 1 looking in the direction of the arrows;

FIG. 3 is a fragmentary sectional view taken on the line 3—3 of FIG. 1 looking in the direction of the arrows;

FIG. 4 is a view similar to FIG. 3, showing a modified construction which may be used in place of the parts shown in FIG. 3;

FIG. 5 is a view of a still further modified construction that may be used in place of the parts shown in FIG. 3;

Figure 8:
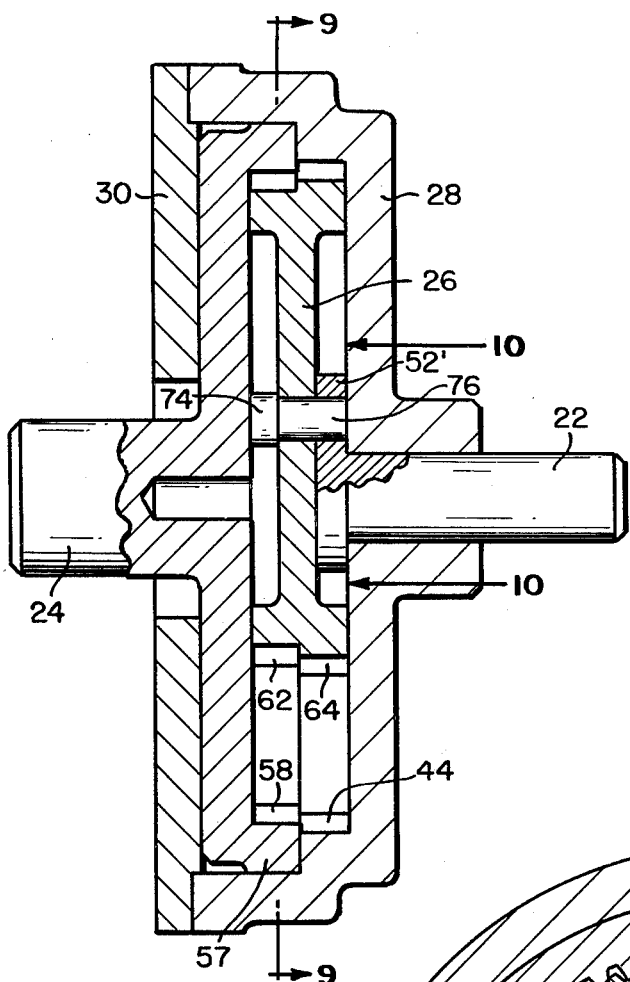
FIG. 8 is a part elevation, part sectional view of a speed reducer made according to a different embodiment of the invention from that shown in FIG. 1.

Referring now to the drawings by numerals of reference, and first to FIGS. 1 to 3 inclusive, 20 denotes a two-part housing having a high speed drive shaft 22, and a low speed driven shaft 24 journaled in the two parts 28 and 30, respectively, of the housing. The two shafts are coaxial. The two parts of the housing are also coaxial, and are secured to one another at their contiguous plane surfaces 32 and 34 by bolts or other suitable means (not shown).

The shaft 22 is journaled in a bore 38 in the hub portion of the housing section 28. The end face 32 of this housing section is a plane surface perpendicular to the axis of the bore 38. This section is formed with two other plane surfaces 39 and 40, offset from one another and from plane end surface 32 and of successively smaller diameter. These plane surfaces are also perpendicular to the axis of the bore 38. This housing section has an internal cylindrical surface 42 coaxial with the axis of the bore 38 and is also formed with internal gear teeth 44. The internal gear 44 is of smaller diameter than the cylindrical surface 42 but is coaxial with that surface and with the axis of the bore 38.

The housing section 30 has an inside plane surface 46 parallel to its plane surface 34 and is connected with that plane surface 34 by the cylindrical shoulder 48. The diameter of the shoulder 48 corresponds to that of the internal cylindrical surface 42 of the housing section 28 and bears thereon for a male and female type connection for a male and female fit between the two parts of the housing.

Integral with the shaft 22 is a crank member 51 which has a substantially radial groove 52 in it (FIG. 2). Shaft 22 can be coupled to the high speed shaft of a machine or other units (not shown).

The low speed shaft member 24 has a generally disk-shaped flange 56 integral with it, whose peripheral surface 57 is cylindrical and bears on the cylindrical internal surface 42 of the housing section 28. The portion of the shaft 24 which projects beyond the housing section 30 can be coupled to any part which is to be driven by the gear unit. The flange portion 56 has a plane rear face 55 which matches and bears against the plane surface 46 of the housing section 30. This surface 55 is perpendicular to the common axis of the shafts 22 and 24.

The flange 56 is formed with an internal gear 58 which is coaxial with the axes of shafts 22 and 24.

Disposed in the housing in cylindrical recesses 69 and 71 in the two internal gears 58 and 44 is an external gear cluster 26. The cluster gear 26 consists of two coaxial externally toothed gears 62, 64, which are of different diameters; and it has a bore 66 which is concentric with these two gears. The two recesses 68 and 70 formed in these two gears are concentric with the toothed portions of the two gears.

The external gears 62 and 64 mesh, respectively, with the internal gears 58 and 44, respectively. The gears 62 and 64 are in perfect mesh simultaneously with the internal gears 58 and 44, respectively. This is possible for two reasons: 1) because of the geometry and arrangement of the main components of the drive as shown in FIG. 1 and described above, and 2) because the difference between the pitch radii of the gears 44 and 64, indicated at $e$ in FIG. 2, is equal to the difference between the pitch radii of the gears 58 and 62. Dimension $e$ is the eccentricity, that is, the distance between the axes of the cluster gear 26 and of the coaxial shafts 22, 24. The function of the remaining components of the unit is to assure that the eccentricity $e$ is constantly maintained, and, therefore, that the gears 64, 44, 62, 58 stay in constant mesh.

Mounted in a blind bore 60 in the shaft 24 coaxial with shafts 22 and 24 is a cylindrical pin 72 which has a pressed fit in bore 60. The pin projects beyond the bore and carries a thrust roller 80. Mounted in the cluster gear 26 is a pin 76 which engages at one end in a radial slot 52 in the crank 51 and which is formed at its other end with a cylindrical bearing portion 74 which engages and rides on the periphery of the roller 80. The length of bearing portion 74 corresponds to the counterbore of recess 68 in the cluster gear 26; and the diameter of the smaller section of the pin 76 corresponds to the width of the slot 52 in the crank member 51, as shown in FIG. 2, for a reasonably light slide fit. The length of this pin, which projects beyond the cluster gear, corresponds to the depth of the counterbore or recess 70 in the cluster gear.

The roller 80 constitutes a radial thrust member. It is the function of the roller 80 to insure that the center distance between the axis of the shafts 22 and 24 and the axis of the cluster gear 26 is maintained when the unit is assembled, so as to keep the gears 64, 44 and 62, 58 in constant mesh.

The speed ratio R for the drive unit shown in FIG. 1 can be expressed as $R = n_{HS}/n_{LS}$, where $n_{HS}$ and $n_{LS}$ designate the angular rotations of the high speed shaft member 22 and of the low speed shaft member 24, respectively. Another expression for the calculation of the speed ratio R can be written as: $R = N_b N_D/(N_b N_D - N_A N_c)$, where $N_A$, $N_b$, $N_c$, and $N_D$ designate the number of teeth in the gears 44, 64, 62, 58 respectively. For the drive unit shown in FIG. 1 $N_A = 66$ and $N_b = 50$, and $N_c = 48$ and $N_D = 64$. Consequently, the speed ratio for the drive unit shown in FIG. 1 can be calculated as $R = 50 \times 64/(50 \times 64 - 66 \times 48)$, to obtain $R = 100$. The value of $R$ obtained in this case is positive which indicates that the direction of rotation for both shafts 22 and 24 is the same. A negative value for $R$ would indicate opposite directions of rotation for these two shafts.

Lower, or much higher, speed ratio values are obtainable by changing the number of teeth in the gears 44, 64, 62, 58. Thus practically any value for $R$ can be obtained that may be required for a particular application of the gear unit.

The gear unit described, and illustrated in FIG. 1, can thus be used as a speed reducer. In this case the high speed crank shaft member 22 is the driver and the low speed shaft 24 is the driven shaft with a speed ratio $R = 100$ and the direction of rotation is the same for both shafts. The operation of the drive unit is as follows:

Rotation of the driver 22 causes the axis of the portion 74 of the pin 76 and of cluster gear 26 to rotate in a circular orbital manner about the common axis of the shafts 22, 24 and the gears 44, 58, while the gears are held in mesh simultaneously and constantly by the thrust member 80. The rotation of the axis of cluster gear 26 about the axis of the shafts 22, 24 is accompanied by rotation of the cluster gear relative to both gears 44 and 58. The result of this is that any point of the cluster gear will move along a hypotrochoidal path relative to the gear 44, and the same point will also trace another hypotrochoidal path relative to the gear 58. As a special case of these trochoidal motions, points along the axis of the cluster gear will move on circular paths relative to the two gears 58, 44. As another special case, points along the pitch circles of the gears 62, 64 will trace hypocyclodial paths relative to the corresponding gears 44, 58. Still another special case arises if either gear 64 or 62 is half the size of the gear 44 or the gear 58, respectively. In this latter case points along the pitch circle of the cluster gear will move along straight lines relative to the meshing internal gear, and any other points of the cluster will trace elliptical paths relative to the meshing internal gear 44 or 58. All these facts, of course, are well known in mathematics and kinematics, and therefore need not be discussed further. However, it is the effect of the relative motions just described which will produce the trochoidal planetary differential movements to obtain a particular speed ratio between the shafts 22 and 24.

A drive unit such as is illustrated in FIG. 1 may also be used as a speed multiplier if the combined effects of high speed ratio values and other particular factors of design and manufacture are not too serious. Used as a speed multiplier the low speed shaft 24 is the driver and the high speed shaft 22 is the driven member.

There are a number of important features and advantages related to the drive shown in FIG. 1. Some of the main advantages are as follows:

Several advantages of the construction stem from the fact that the radial support of the low speed shaft member 24 is provided by the enlarged bearing surface 42 whose diameter is larger than that of the pitch circles of either gear 44 or 58. The conventional way of supporting the shaft 24 radially in the housing section 28 would be at the reduced diameter of the shaft 24. Consequently the first advantage of the arrangement illustrated in FIG. 1 is that it eliminates the need for a hub for the radial support of the low speed driven member 24. This results in a drive unit which is very compact.

A second advantage of the arrangement in FIG. 1 is that the large diameter radial bearing support of the shaft 24 in the housing section 30 is inherently stronger than would be experienced with the conventional hub type support. It is also to be noted that the radial support of shaft 24 in the housing section is substantially in line with the radial component of the heavy load on the gear 58 in contrast to the conventional hub type support which would result in a considerable offset between said radial load and the support in the longitudinal direction.

This longitudinal in-line feature of supporting the shaft 24 results still in other advantages. One of these is that the deflections of the shaft 24 under load are minimized, which is ideal from the view point of gear tooth actions for the transmittal of heavy loads. The second advantage is that the axial forces and friction between the surfaces 46 and 55 are minimized, which is favorable from the standpoint of operational efficiency. The third very important advantage is that the in-line support of the shaft 24 in the housing 28 is much superior to the conventional hub type support from the viewpoint of components of precision requirements because it drastically reduces the required concentricity and other dimentional variations and build-up problems which is typical of the conventional method.

Another significant advantage of the drive shown in FIG. 1 is that it uses a small diameter pin 72 for the radial support of the cluster gear 26 in contrast to the huge size of the eccentric required in conventional units which are subject to high frictional losses, and which normally require the use of expensive and noisy roller bearings for the high speed shaft and the eccentric.

Still another important advantage of the drive unit shown in FIG. 1 is that due to use of a slotted crank shaft member 22 with the substantially radial slot 52, the high speed crank is not subjected to the heavy loads which would ordinarily result from the radial components of the tooth forces on the gears 62 and 64 of the cluster. Because the high speed crank is not subjected to heavy loads, the radial load on the high speed crank shaft bearing 38 is minimized, which, of course, is favorable from the viewpoint of increased mechanical efficiency.

Simplicity of the components and of the overall construction of the drive shown in FIG. 1 is another advantage. The pins 76 and 72, of course, could be made integral with the parts 26 and 24, respectively. In this case the drive would contain only three main moving components, namely, the high speed and low speed shaft members 22 and 24 and the cluster gear 26. The only other moving part would be a simple, inexpensive radial thrust member 80.

Ecomony of the component manufacture is also an important factor in the drive unit shown in FIG. 1. Simple and inexpensive involute gears, for instance, can be used rather than sophisticated gear types of questionable characteristics.

Minor variations in the drive unit shown in FIG. 1 may be desirable in certain applications. For instance, the radial thrust member might be in the form of a simple arm or link, as indicated at 82 in FIG. 4, having a cylindrical bore for the reception of the pin 72 and a semi-cylindrical seat for the reception of the head 74 of the pin 76. The axes of the pins 72 and 74 are parallel and the distance between them is the distance $e$, which is the same as shown in FIG. 2. The diameter of the bore in which the pin 72 engages is the same as the diameter shown in FIGS. 1 and 3; and the diameter of the semi-cylindrical portion of the slot 84 corresponds to that of the pin 74; and the thickness of the member 82 corresponds to the depth of the recess 68 in the cluster gear 26. Consequently the roller 80 in FIGS. 1 and 3 can be replaced by the part 82 (FIG. 4). The use of the part 82 rather than the part 80 may be advantageous in application where the eccentricity $e$ is relatively small.

Another minor variation in construction of the radial thrust member may be a simple arm or bar link 86 such as shown in FIG. 5, with a bore for the pin 72 and another bore for the pin 74. The axes of the pins 74 and 72 are again parallel and the distance between them is the eccentricity $e$, which is the same as that shown in FIGS. 1 and 2. The thickness of the part 86 corresponds again to the depth 68 of the recess in the cluster gear 26. Consequently the part 86 can readily be used in place of the radial thrust member 80 of FIG. 1.

Figure 6:
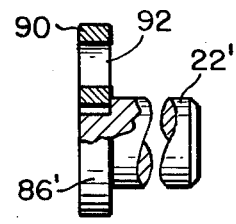
FIG. 6 is an elevational part sectional view showing a crank construction which may be used in place of that illustrated in FIG. 1.
Figure 7:
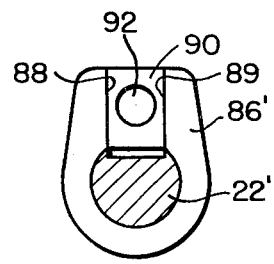
FIG. 7 is an end elevation of the crank and bushing of FIG. 6.
Figure 10:
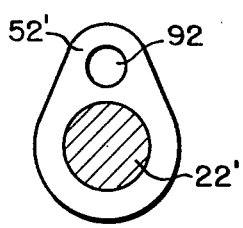
FIG. 10 is a part end elevation, part sectional view taken on the line 10—10 of FIG. 8 looking in the direction of the arrows, and showing the crank used in that embodiment of the invention.

An alternate construction for the crank shaft member 51 of FIG. 1 is shown in FIGS. 6 and 7. The flange 86' of the crank shaft 22' in these figures has a substantially radial slot 88 formed in it which has straight, parallel side walls 88 and 89, in which is slidably mounted a bearing member 90 having a bore 92 to receive the pin 76. The thickness of both the flange 86' and of the bearing member 90 corresponds to the depth of the recess 70 in the cluster gear 26. Consequently, the crank shaft member and bearing arrangement illustrated in FIGS. 6 and 7 can be used to replace the crank shaft member as shown in FIGS. 1 and 2.

Figure 9:
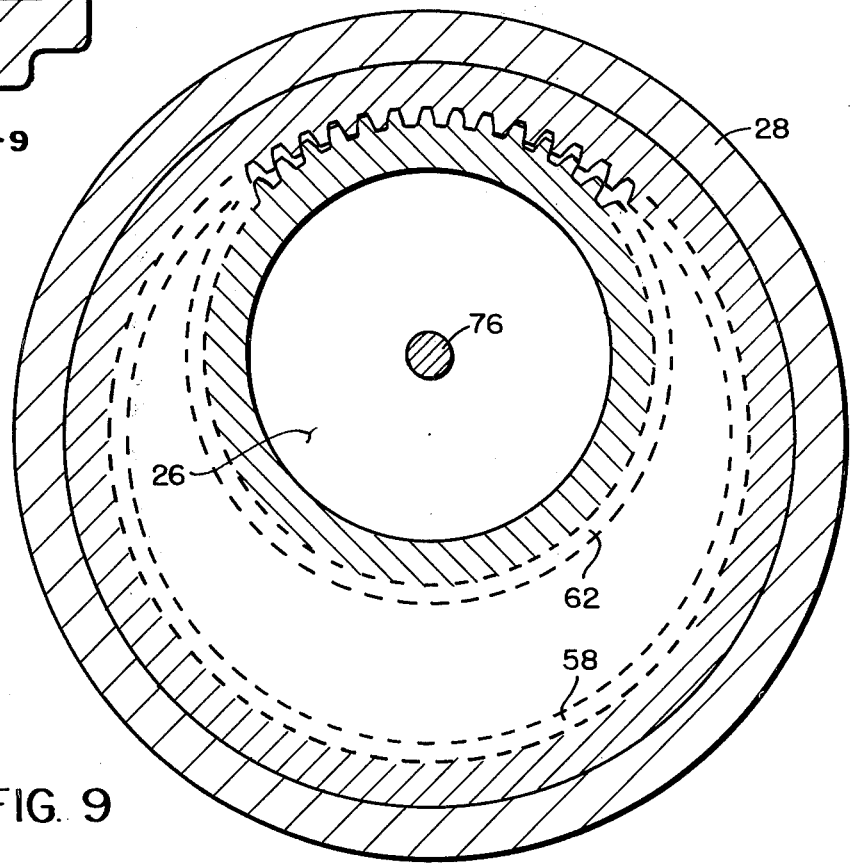
FIG. 9 is a sectional view of this speed reducer taken on the line 9—9 of FIG. 8 looking in the direction of the arrows.

The drive unit shown in FIGS. 8 and 9 represents another embodiment of the invention, using an ordinary crank mechanism rather than the sloted crank mechanisms described in conjunction with FIG. 1. In this case the crank also serves as the radial thrust member. This crank has a flange 52' with a cylindrical hole to receive the pin 76. The axes of the pin 76 and of the shaft 22 are parallel and the distance between them is the distance $e$ as before. All other components of the drive unit in FIG. 8 are as described in conjuction with FIG. 1 although the head 74 of pin 76 and the thrust member 80 may be omitted, as well as the pin 72. This simplified construction of the drive unit in FIG. 8, however, has the slight disadvantage of somewhat lower mechanical efficiency than that of the drive of FIG. 1 because of the higher bearing friction on the shaft 22 due to the radial components of the tooth forces on the gears 62 and 64 acting against the shaft 22.

Another alternate design, not illustrated, would result from replacing the pin 76 of FIG. 8 by a pin fixed in the flange 52' of the crank and rotatable in the cluster gear 26. This pin might also be made integral with the flange 52' to support the cluster gear 26 radially within the housing section 28.

Figure 11:
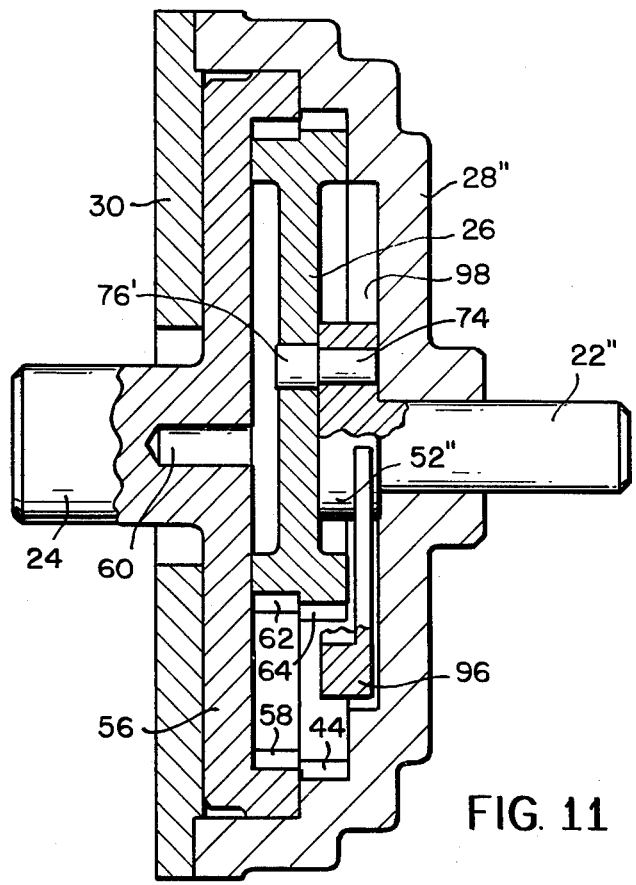
FIG. 11 is a part elevation, part sectional view of a speed reducer unit made according to a still further embodiment of the invention.
Figure 12:
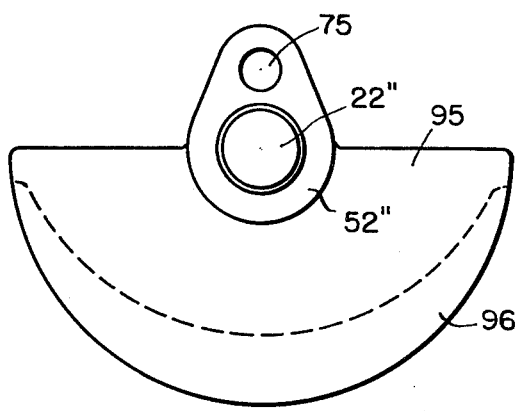
FIG. 12 is an end elevation of the crank and associated counterbalance used in the embodiment of the invention illustrated in FIG. 11.

The drive unit shown in FIGS. 11 and 12 is similar to that in FIG. 8, but differs therefrom in embodying means for counterbalancing the gravitational and centrifugal effects of the cluster gear 26. This counterbalancing is achieved by use of a semi-circular disc extension 95 having a crescent shaped counterweight 96 integral therewith. The connecting pin 76', which is mounted in the bore 75 of this modified form of crank, can either be fixed in or made integral with the flange 52'' of the crank member. The distance between the axis of the pins 76 and shaft 22'' is the distance $e$ as in the other embodiments of the invention. The housing section 28'' is very similar to the housing section 28 except for the additional counterbored portion 98 required to accommodate the counterbalance member 95.

While several different embodiments of the invention have been described, the invention is capable of further modification, as will be apparent to those skilled in the art; and this application is intended to cover any variation or modifications of the invention that come within the scope of the invention, or the limits of the appended claims.

Having thus described my invention, what I claim is:
1. A gear unit comprising
   a housing,
   two axially-aligned shafts, both of which are journaled in said housing, two internal gears mounted in said housing coaxially with said shafts, and slightly offset from each other along the common axis of said shafts, one of said internal gears being fixed in said housing, and the other being secured to one of said shafts, and having thereon a circumferential outer peripheral surface, a crank secured to the other of said shafts, said other internal gear being rotatably journaled on its outer peripheral surface in said housing, a cluster gear, said cluster gear comprising two externally-toothed gears of different diameters, respectively, one of which meshes with said fixed internal gear and the other of which meshes with said other internal gear, said cluster gears being coaxial but having their common axis parallel to but offset from the axis of said shafts, and a crank pin secured to said crank coaxially with said cluster gear and connecting said crank to said cluster gear.

2. A gear unit as claimed in claim 1, wherein said cluster gears are disposed within confronting recesses in the two internal gears.

3. A gear unit as claimed in claim 1, wherein said externally-toothed gears have different pitch diameters and the two internal gears also have corresponding different pitch diameters.

4. A gear unit comprising a housing, two axially-aligned shafts, both of which are journaled in said housing, two internal gears mounted in said housing coaxially with said shafts, one of said internal gears being fixed in said housing, and the other being secured to one of said shafts, a crank secured to the other of said shafts, said other internal gear being journaled on its periphery in said housing, a cluster gear, said cluster gear comprising two externally-toothed gears of different diameters, respectively, one of which meshes with said fixed internal gear and the other of which meshes with said other internal gear, said cluster gears being coaxial but having their common axis parallel to but offset from the axis of said shafts, and a crank pin secured to said crank coaxially with said cluster gear and connecting said crank to said cluster gear, said pin having an enlarged head portion, and said one shaft having a cylindrical thrust bearing portion coaxial with said shafts and on the periphery of which said enlarged head rides.

5. A gear unit as claimed in claim 4, wherein the difference in the pitch diameters of the externally-toothed gears and the pitch radii of the internally-toothed gears is equal to the offset between the common axis of the externally-toothed gears and the common axis of the two shafts.

6. A gear unit comprising a housing, two axially-aligned shafts, both of which are journaled in said housing, two internal gears mounted in said housing coaxially with said shafts, one of said internal gears being fixed in said housing, and the other being secured to one of said shafts, a crank secured to the other of said shafts, said other internal gear being journaled on its periphery in said housing, a cluster gear, said cluster gear comprising two externally-toothed gears of different diameters, respectively, one of which meshes with said fixed internal gear and the other of which meshes with said other internal gear, said cluster gears being coaxial but having their common axis parallel to but offset from the axis of said shafts, and a crank pin secured to said crank coaxially with said cluster gear and connecting said crank to said cluster gear, said crank being provided with a radial slot and said pin being of the same diameter as the width of said slot and engages in said slot.

7. A gear unit as claimed in claim 1, wherein the outer peripheral surface of said other internal gear is of larger diameter than the diameters of either of said internal gears.

8. A gear unit as claimed in claim 1, wherein said housing comprises two sections secured together in abutting relation, and said shafts are both journaled in the same section of said housing, one of said shafts being journaled therein by the internal gear which is secured to it.

9. A gear unit comprising a housing having two sections, a first internal gear rigid with one of said sections, said one section having an internal bearing surface coaxial with said internal gear and of larger diameter than the pitch diameter of said internal gear, a first shaft journaled in said one section coaxial with said first internal gear, a cluster gear member mounted in said housing and having two coaxial externally-toothed gears of different pitch diameters secured to it, one of said externally-toothed gears meshing with said first internal gear, a second shaft, a second internal gear mounted in said housing and secured to said second shaft coaxial with said second shaft and journaled in said internal bearing surface and meshing with the other of said externally-toothed gears, said cluster gear member contacting on one side with the internal side wall of said first section and contacting on its other side with the side wall of a recess in said second internal gear, the difference between the pitch diameters of said externally toothed gears being equal to the difference between the diameters of said first and second internal gears, a crank secured to said first shaft, and means connecting said crank to said cluster gear member to transmit motion between said crank and said cluster gear member, said crank having a flange type extension thereon engaging in said cluster gear member for axial guidance and support of said crank in said housing.

10. A gear unit as claimed in claim 9, wherein a cylindrical radial thrust member is secured to said second internal gear coaxially thereof, and a bearing member is secured to said cluster gear to ride on the periphery of said thrust member to support said cluster gear member in said housing.

* * * * *